Patented May 8, 1934

1,957,459

UNITED STATES PATENT OFFICE 1,957,459

ANTHRAQUINONE BODY AND PROCESS OF PREPARING THE SAME

Edward T. Howell, Milwaukee, Wis., assignor, by mesne assignments, to E. I. du Pont de Nemours & Company, a corporation of Delaware No Drawing. Application October 19, 1929, Serial No. 401,018

28 Claims. (Cl. 260—61)

This invention relates to a process of preparing anthraquinone derivatives and to the bodies so prepared. Some of these bodies are themselves, dyestuffs. Others of them are used as intermediates for dyestuffs and/or for the preparation of other intermediates.

More specifically this invention relates to the dyestuffs which may be derived by reacting upon Bz-1, Bz-1'-dibenzanthronyl bodies with nitrating agents, the reduction of the nitro bodies so formed to the corresponding amines and the condensation of the nitro and amino bodies to the dyestuffs. A compound of the dibenzanthronyl class mentioned above, is described in U. S. Patent No. 1,607,491 and it is assumed to have the following formula:

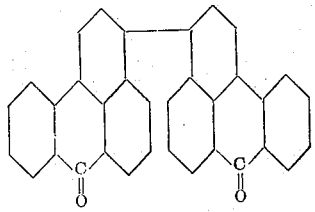

It is accordingly an object of this invention to form anthraquinone dyestuffs by condensing nitro and amino dibenzanthronyl bodies, especially the amino-Bz-1, Bz-1'-dibenzanthronyls.

It is a further object of this invention to provide a process of preparing new nitro and amino bodies by nitrating Bz-1, Bz-1'-dibenzanthronyl bodies and reducing the nitro compound so formed.

Other and further important objects will become apparent from the following description and appended claims.

I have found that dibenzanthronyl of the above general formula can be nitrated in a variety of ways and, depending upon the specific method employed, there are obtained mono-nitrated dibenzanthronyls or polynitro-dibenzanthronyls. The positions of the entering groups in the dibenzanthronyl nucleus appear to be governed considerably by the specific method of nitration used.

The mono-nitro and dinitro-dibenzanthronyls may be reduced by known methods of reducing similar bodies and give well characterized amines. The nitro and amino-Bz-1, Bz-1'-dibenzanthronyls, which have a 2.2'-position occupied by hydrogen, are readily condensable by the use of alcoholic potash and similar of such reagents as condensing agents which have been previously described for similar reactions.

The condensation products of the nitro and amino-Bz-1, Bz-1'-dibenzanthronyls are vat dyestuffs which dye cotton in gray to black shades, have excellent fastness properties with respect to light, washing and in many cases, with respect to bleaching agents. The condensation products are, to the best of my knowledge, dibenzanthrone bodies.

The following examples, in which parts by weight are given, will serve to illustrate the nature of the invention. It is to be understood, however, that the invention is not limited to the specific examples disclosed.

Example 1

100 parts of Bz-1, Bz-1'-dibenzanthronyl (see Example 1, U. S. P. 1,607,491) are added to 500 parts of nitrobenzene and the mixture heated, while stirring, to 60° C. 250 parts of nitric acid 41° Bé. are then added over a period of about one hour and the temperature of the mass raised to 80° C. The nitration mass is stirred for about 3 hours at a temperature of 80 to 90° C. It is then cooled and poured into 500 parts of water containing 175 parts of sodium carbonate. The nitrobenzene is removed by distillation with steam. The precipitate is filtered off and washed with hot water. The product may then be dried.

The new product, so obtained, is a yellowish-brown powder, soluble in concentrated sulfuric acid with a bright, yellowish-red color without fluorescence. It dissolves sparingly in ordinary low boiling organic solvents with a yellow color, but is easily soluble in hot nitrobenzene, from which it can be recrystallized in the form of minute yellowish-brown crystals. The product does not melt when heated as high as 300° C. On the basis of the nitrogen analysis, it is believed to be a dinitro-Bz-1, Bz-1'-dibenzanthronyl.

Example 2

15 parts of Bz-1, Bz-1'-dibenzanthronyl (Example 1, U. S. P. 1,607,491) are added to 150 parts of nitrobenzene. There are then slowly added, at room temperature, 35 parts of nitric acid 41° Bé. The mass is heated, while stirring, to 40 to 45° C., and is stirred at that temperature for 4 hours. The nitration mass is then charged into 300 parts of water, containing 30 parts of sodium carbonate and steam distilled to free it from nitrobenzene. The product is further worked up as in Example 1.

The product thus obtained is substantially a mono-nitro-dibenzanthronyl as determined by nitrogen analysis. It consists of a yellowish-brown powder, soluble in concentrated sulfuric acid with a bright red color, sparingly soluble with yellow color in low boiling organic solvents, and easily soluble in hot nitrobenzene from which it can be recrystallized in minute yellowish-brown crystals.

Example 3

25 parts of Bz-1, Bz-1'-dibenzanthronyl (see Example 1, U. S. P. 1,607,491) are added to 250 parts of 98% sulfuric acid. The solution is cooled, while being agitated, to from 0 to 5° C. 12.5 parts of nitric acid, 41° Bé., are then added over a period of 1 hour, the temperature being maintained under 7° C. The nitration mass is stirred for 15 hours at 2 to 5° C. then warmed to 25° C. and stirred for an additional 24 hours. It is then poured into 2500 parts of water whereupon the product separates. The precipitate is filtered off, washed practically acid free with water, then with a dilute caustic soda solution and finally with water. The yield appears to be practically quantitative.

The product in paste form is yellowish-brown in color. After drying, it is a dark brown powder. The dry powder is soluble in concentrated sulfuric acid with a yellowish-red color, and sparingly soluble in low boiling organic solvents. It dissolves somewhat more readily in boiling nitrobenzene with an intense yellow color. Upon cooling the solution, deposits of minute yellowish-brown crystals are obtained. The product is substantially a dinitro-dibenzanthronyl.

Example 4

25 parts of Bz-1, Bz-1'-dibenzanthronyl (U. S. P. 1,607,491 Example 1) are added to 250 parts of sulfuric acid 98%. The solution, while stirred, is cooled to 5° C. 5.5 parts of nitric acid 41° Bé. are then added over a period of about one half hour, the temperature being maintained at 2 to 5° C. The mass is agitated at 2 to 5° C. for an additional 15 hours, then warmed to 25° C. and stirred an additional 24 hours at this temperature. The resulting mixture is then worked up as in Example 3. The product obtained is similar in physical properties to that obtained in Example 3. It is, however, substantially a mono-nitro-dibenzanthronyl.

Example 5

5 parts of beta-beta'-dichloro-dibenzanthronyl (obtainable by oxidizing beta-chloro-benzanthrone obtainable from beta-chloro-anthraquinone) are added to 100 parts of sulfuric acid, 66° Bé. The solution under agitation is cooled to 2° C. and 1 part of nitric acid, 41° Bé., is slowly added so that the temperature does not exceed 5° C. The nitration mass is stirred for an additional 2 hours at 2 to 5° C. and then allowed to warm slowly to room temperature. It is stirred for an additional 20 hours at about 25° C. The mass should show under these conditions complete absorption of nitric acid. The nitration mass is poured into 1000 parts of cold water and further worked up as in Example 3.

The nitrochloro-dibenzanthronyl obtained consists of a yellowish-brown powder, soluble with difficulty in low boiling organic solvents to which it imparts an intense yellow color. The new compound is somewhat more soluble in hot nitrobenzene imparting thereto a yellow color. In concentrated sulfuric acid, it dissolves with the production of Bordeaux color.

In the above examples given to illustrate the method of nitration, other solvents or diluents may be employed to give similar results. Similarly other Bz-1, Bz-1'-dibenzanthronyls, substituted in the anthraquinone nucleus, may be employed as starting materials.

The following examples are given to illustrate the reduction of the above nitro derivatives of Bz-1, Bz-1'-dibenzanthronyls. The parts are by weight.

Example 6

35 parts of the dinitro-dibenzanthronyl (obtainable according to the process described in Example 1) are dissolved in 700 parts of sulfuric acid, 97 to 98%, under agitation and cooled to 5° C. 7 parts of aluminum powder are then added over a period of about 3 hours, while maintaining the temperature at 2 to 5° C. The reduction mass is stirred for 5 hours at 2 to 5° C. and then warmed to room temperature and stirred for 24 hours more at that temperature. The reduction mass is then poured into 7000 parts of water. The precipitate which forms is filtered off and the filter cake washed practically acid free with warm water.

The product obtained is, after drying, of a maroon red color, soluble in concentrated sulfuric acid to which it imparts a bright yellowish red color with an intense orange fluorescence. If a solution in concentrated sulfuric acid is slowly diluted with water, a yellow precipitate of the amino-sulfate falls out. If this precipitate is filtered off and then added to water it hydrolyzes to the amine. The new body is sparingly soluble in common low boiling organic solvents, even when hot, but is somewhat soluble in hot aniline imparting thereto an orange brown color. In o-dichlor-benzene it dissolves sparingly with an orange brown color and green fluorescense.

Example 7

An amount of aqueous paste, equivalent to 15 parts of dinitro-dibenzanthronyl (obtainable according to Example 1) is digested with a solution of 300 parts of water, 5 parts of caustic soda, and 25 parts of fused sodium sulfide. The reaction mixture is stirred for about one-half hour at the boiling point of the solution. The color of the mass changes from a brownish-yellow to an olive-green and finally to a reddish-brown. The precipitate is filtered off and washed with hot water. The yield of the product which is similar in properties to that of Example 6, is almost theoretical.

Example 8

The dinitro-dibenzanthronyl (as obtained in Example 3) is reduced as in Example 6. The product obtained consists of a dark reddish-brown powder. This product is only sparingly soluble in hot, low boiling organic solvents, but somewhat more soluble in boiling nitrobenzene and aniline. It dissolves in concentrated sulfuric acid with an intense red color.

Example 9

15 parts of Bz-1, Bz-1'-dibenzanthronyl are dissolved in 300 parts of sulfuric acid 97 to 98%, while being continuously agitated. The solution is cooled to 2° C. and 3.25 parts of nitric acid, 41° Bé., slowly added so that the temperature does not rise above 5° C. The nitration mass is agitated at 2 to 5° C. for 15 hours and then warmed to room temperature and stirred an additional 24 hours. The mixture is then cooled to 2° C. and 2 parts of aluminum powder added over a period of about 3 hours, the temperature being maintained at 2 to 5° C. The reaction mixture is then stirred an additional 5 hours at 2 to 5° C., and then warmed to room temperature and stirred an additional 24 hours. The reduction mass is then poured into 3000 parts of water. The yellowish-brown precipitate so obtained is filtered off and washed with water, until practically acid free.

The product after drying is an orange brown powder, substantially a mono-amino-dibenzanthronyl. It is soluble in concentrated sulfuric acid with a bluish red color. The product is only sparingly soluble in alcohol, glacial acetic acid and toluol, but more soluble in hot nitrobenzene, imparting thereto a brown color, and in hot aniline, imparting thereto an orange-brown color. By fusion with caustic potash and alcohol a dyestuff dyeing cotton in gray to black shades is obtained.

Example 10

The nitro-dibenzanthronyl body (obtained as in Example 5 above) may be reduced in an analogous manner as, for instance, in Example 6. The product then obtained is a reddish-brown powder soluble in concentrated sulfuric acid with a reddish-brown color. The amino-chloro-dibenzanthronyl is obtained in a practically theoretical yield.

Other nitro-Bz-1, Bz-1'-dibenzanthronyls, as are disclosed in the above examples, may be reduced in an analogous manner to produce amino-dibenzanthronyls.

While dyestuffs of the type disclosed herein, may be prepared by condensing the nitro-dibenzanthronyls, as illustrated in Example 16 below, the formation of the dyestuffs by condensing the amino-dibenzanthronyls is to be preferred, as the latter method appears to result in a greater yield of the desired product.

The following examples describe methods applicable to the condensation of the amino-Bz-1, Bz-1'-dibenzanthronyls of this invention. The parts are by weight.

Example 11

10 parts of diamino-Bz-1, Bz-1'-dibenzanthronyl (obtained as in Example 6) are added to a melt of 30 parts of caustic potash and 30 parts of ethyl alcohol at a temperature of 100° C. The melt is heated to 125° C. whereupon some alcohol distills off. This melt is then stirred for two hours at 125° C. Reaction appears to set in at 115 to 120° C. as evidenced by the blue coloration of the melt. When the reaction is complete, which is usually the case after 1 to 2 hours, the melt is diluted with 300 parts of cold water and then precipitated by aeration. The mass is heated to the boiling point, filtered and the filter cake washed alkali free with water.

The product thus obtained is a black paste and, when dried, a black powder. It is soluble in concentrated sulfuric acid with reddish violet color. With alkali hydrosulfite solution it gives a reddish violet vat with red fluorescence from which cotton is dyed in violet shades turning to a gray to black on exposure to the air depending upon the strength of the dyeing.

Example 12

The diamino-Bz-1, Bz-1'-dibenzanthronyl (as obtained in Example 8) is fused as in the foregoing Example 11. A product is thereby obtained consisting of a black powder, soluble in concentrated sulfuric acid and in alkaline hydrosulfite with a brilliant, reddish violet color. Weak dyeings on cotton give greenish-blue shades, strong dyeings give greenish-black shades.

Example 13

10 parts of the mono-amino-Bz-1, Bz-1'-dibenzanthronyl (as obtained by the reduction of the mono-nitro-dibenzanthronyl of Example 2) are fused in a melt of 30 parts of caustic potash and 30 parts of ethyl alcohol (as in Example 11). The product obtained, after drying, consists of a black powder soluble in concentrated sulfuric acid with a reddish-violet color. It dissolves in alkali hydrosulfite solution giving a reddish-violet vat from which cotton is dyed in neutral gray shades after exposure to the air.

Example 14

10 parts of the mono-amino-Bz-1, Bz-1'-dibenzanthronyl (obtainable as described in Example 9) are added to a melt of 30 parts of caustic potash and 30 parts of ethyl alcohol at a temperature of about 100° C. The temperature is then raised to 125 to 130° C. whereby some alcohol distills off. The reaction mixture is maintained for 1 to 2 hours at this temperature, and is then diluted with 300 parts of water. The mass is heated to the boiling point, filtered, and the solid washed with water to free it from alkali. The product thus obtained is a black paste or, if dried, a black powder. It is soluble in concentrated sulfuric acid with a reddish-violet color and in alkali hydrosulfite solution with a reddish-violet color from which cotton is dyed in bluish gray to black shades after exposure to the air.

Example 15

The dichloro-amino-Bz-1, Bz-1'-dibenzanthronyl (as obtainable in Example 10) is fused (as in Example 11 above). The product obtained is soluble in alkali hydrosulfite solution with bluish violet color from which cotton is dyed blue, turning to a neutral gray shade on exposure to the air.

Example 16

10 parts of di-nitro-dibenzanthronyl (obtainable according to Example 1) are added to a melt of 40 parts of caustic potash and 40 parts of ethyl alcohol at 100° C. The mass is heated to 120° C. and stirred for two hours at this temperature. The reaction mixture is then worked up in the usual manner, that is, poured into water, areated, and filtered. The product thus obtained is a black paste or black powder soluble in concentrated sulfuric acid with a reddish-violet color. It is sparingly soluble in organic solvents. It dissolves in alkali hydrosulfites giving a reddish-violet vat from which vegetable fibers are dyed blue, turning to gray to black shades after exposure to the air.

Other nitro and polynitro-dibenzanthronyls of this invention may be fused with alcoholic potash to give similar vat dyestuffs.

The condensation of amino-Bz-1, Bz-1'-dibenzanthronyls to form dyestuffs, in general, can likewise be carried out by other condensing agents than alcoholic potash. For instance, caustic potash in the presence of aniline or phenol or other diluents, may be used as condensing agents. It will be noted that in all the examples above the condensation was carried out at relatively low temperature, that is, between about 100° C. and about 130° C. Under such relatively mild fusion conditions substantially all of the nitrogen is retained in the product. This circumstance contrasts my process and product with such processes where high fusion temperatures are employed (up to 225-230° C.), which result in the substantial elimination of all the nitrogen and yield a product which is very probably dibenzanthrone. My novel products, on the other hand, although undoubtedly belonging to the dibenzanthrone family, are nevertheless not simple dibenzanthrone, because of the fact that they contain nitrogen, very probably in the form of a pyrrole ring. The dyestuffs obtained above may be purified by dissolving them in concentrated sulfuric acid and then adding a diluent to precipitate them from solution.

I am aware that many changes may be made, and numerous details of my process may be varied through a wide range without departing from the principles of this invention, and I, therefore, do not purpose limiting the patent granted hereon, otherwise than necessitated by the prior art.

In the claims below it should be understood that where new products, dyestuffs, or articles of manufacture are claimed, I mean to include these bodies not only in substance but also in whatever state they exist when applied to material dyed, printed, or pigmented therewith.

I claim as my invention:

1. Process of preparing dyestuffs of the anthraquinone series which comprises forming a nitro-compound of a Bz-1, Bz-1'-dibenzanthronyl, reducing the nitro-body to its corresponding amine, and condensing the amine by the aid of alkaline ring-closing agents under milder conditions than those leading to substantial elimination of nitrogen.

2. As new products of manufacture, dyestuffs of the anthraquinone series, which may be formed by nitrating a Bz-1, Bz-1'-dibenzanthronyl, reducing the nitro-body to its corresponding amine, and condensing the amine by the aid of alkaline ring-closing agents under milder conditions than those leading to substantial elimination of nitrogen.

3. Process of preparing dyestuffs of the anthraquinone series, which comprises nitrating Bz-1, Bz-1'-dibenzanthronyl in nitrobenzene, forming an amine from the nitro-body, and condensing the amine so formed by the aid of alkaline ring-closing agents.

4. As new products of manufacture, dyestuffs of the anthraquinone series, which may be formed by nitrating Bz-1, Bz-1'-dibenzanthronyl in nitro benzene, reducing the nitro-body to the corresponding amine, and condensing the amine by the aid of alkaline ring-closing agents.

5. Process of preparing dyestuffs of the anthraquinone series, which comprises nitrating Bz-1, Bz-1'-dibenzanthronyl in sulfuric acid, forming an amine from the nitro-body and condensing the amine so formed by the aid of alkaline ring-closing agents.

6. As new products of manufacture, dyestuffs of the anthraquinone series, which may be formed by nitrating Bz-1, Bz-1'-dibenzanthronyl in sulfuric acid, reducing the nitro-body to the corresponding amine, and condensing the amine by the aid of alkaline ring-closing agents.

7. The process of preparing dyestuffs of the anthraquinone series which comprises forming a nitro compound of a Bz-1, Bz-1'-dibenzanthronyl reducing the nitro-body to its corresponding amine, and condensing the amine at temperatures between 100 to 130° C. by the aid of alkaline ring-closing agents.

8. As new products of manufacture, dyestuffs of the anthraquinone series, which may be formed by nitrating a Bz-1, Bz-1'-dibenzanthronyl, reducing the nitro-body to its corresponding amine and condensing the amine at temperatures between 100 and 130° C. by the aid of alkaline ring-closing agents.

9. As new products of manufacture, dyestuffs of the anthraquinone series, which may be formed by nitrating a Bz-1, Bz-1'-dibenzanthronyl in nitro benzene, reducing the nitro-body to its corresponding amine, and condensing the amine at temperatures between 100 and 130° C. by the aid of alkaline ring-closing agents.

10. Process of preparing a nitro-dibenzanthronyl, which comprises reacting Bz-1, Bz-1'-dibenzanthronyl with a nitrating agent.

11. Process of preparing a dinitro-dibenzanthronyl, which comprises dinitrating Bz-1, Bz-1'-dibenzanthronyl in nitrobenzene with a nitrating agent.

12. As new products of manufacture, nitro-Bz-1, Bz-1'-dibenzanthronyl bodies.

13. As new products of manufacture, dinitro Bz-1, Bz-1'-dibenzanthronyl bodies.

14. As new products of manufacture, nitro Bz-1, Bz-1'-dibenzanthronyl bodies obtainable by nitrating a Bz-1, Bz-1'-dibenzanthronyl in nitrobenzene.

15. Process of preparing an amino-dibenzanthronyl which comprises treating a nitro-Bz-1, Bz-1'-dibenzanthronyl with a reducing agent of the type adapted to reduce nitrobenzene to aniline.

16. Process of preparing an amino-dibenzanthronyl which comprises treating a nitro-Bz-1, Bz-1'-dibenzanthronyl, obtainable by treatment of Bz-1, Bz-1'- dibenzanthronyl in nitrobenzene with a nitrating agent, with a reducing agent of the type adapted to reduce nitrobenzene to aniline.

17. Process of preparing a diamino-dibenzanthronyl which comprises treating a dinitro Bz-1, Bz-1'-dibenzanthronyl obtainable by dinitrating Bz-1, Bz-1'-dibenzanthronyl in nitrobenzene, with a reducing agent of the type adapted to reduce nitrobenzene to aniline.

18. As new products of manufacture, amino-Bz-1, Bz-1'-dibenzanthronyl bodies.

19. As new products of manufacture, diamino- Bz-1, Bz-1'-dibenzanthronyl bodies.

20. As new products of manufacture, monoamino Bz-1, Bz-1'-dibenzanthronyl bodies.

21. As new products of manufacture, amino Bz-1, Bz-1'-dibenzanthronyl bodies obtainable by nitrating a Bz-1, Bz-1'-dibenzanthronyl in nitrobenzene and reducing the nitro-body to its corresponding amine.

22. As new products of manufacture, amino Bz-1, Bz-1'-dibenzanthronyl bodies obtainable by nitrating a Bz-1, Bz-1'-dibenzanthronyl in sulfuric acid and reducing the nitro-body to its corresponding amine.

23. Process of preparing dyestuffs of the anthraquinone series which comprises reacting upon an amino-Bz-1, Bz-1'-dibenzanthronyl with a condensing agent of the type adapted to condense dibenzanthronyl to dibenzanthrone.

24. Process of preparing dyestuffs of the anthraquinone series, which comprises reacting upon a diamino Bz-1, Bz-1'-dibenzanthronyl with a condensing agent of the type adapted to condense dibenzanthronyl to dibenzanthrone.

25. In the process of preparing dyestuffs of the anthraquinone series, the step of ring-closing by treatment with a condensing agent of the type adapted to condense dibenzanthronyl to dibenzanthrone a nitrogen containing Bz-1, Bz-1'-dibenzanthronyl body obtainable by a process including the step of nitrating Bz-1, Bz-1'-dibenzanthronyl.

26. In the process of preparing dyestuffs of the anthraquinone series, the step of ring-closing by treatment with a condensing agent of the type adapted to condense dibenzanthronyl to dibenzanthrone a nitrogen containing Bz-1, Bz-1'-dibenzanthronyl body obtainable by a process including the step of nitrating Bz-1, Bz-1'-dibenzanthronyl in nitrobenzene.

27. The process of preparing dyestuffs of the anthraquinone series which comprises reacting upon an amino Bz-1, Bz-1'-dibenzanthronyl at temperatures between 100 to 130° C. with a condensing agent of the type adapted to condense dibenzanthronyl to dibenzanthrone.

28. In the process of preparing dyestuffs of the anthraquinone series, the step of ring-closing by heating at temperatures between 100 and 130° C. with a condensing agent of the type adapted to condense dibenzanthronyl to dibenzanthrone, a nitrogen containing Bz-1, Bz-1'-dibenzanthronyl body obtainable by a process including the step of nitrating Bz-1, Bz-1'-dibenzanthronyl.

EDWARD T. HOWELL.